(12) United States Patent
Miyakoshi et al.

(10) Patent No.: US 10,708,458 B2
(45) Date of Patent: Jul. 7, 2020

(54) IMAGE FORMING SYSTEM FOR REDUCING WRONG PRINTING ORDER

(71) Applicant: FUJI XEROX CO., LTD., Tokyo (JP)

(72) Inventors: Yukiko Miyakoshi, Kanagawa (JP); Yutaka Kiuchi, Kanagawa (JP); Tomoshi Hara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/178,614

(22) Filed: Nov. 2, 2018

(65) Prior Publication Data
US 2019/0297209 A1    Sep. 26, 2019

(30) Foreign Application Priority Data
Mar. 22, 2018    (JP) .................. 2018-053907

(51) Int. Cl.
*H04N 1/00*    (2006.01)
*H04N 1/60*    (2006.01)

(52) U.S. Cl.
CPC ..... *H04N 1/00641* (2013.01); *H04N 1/00721* (2013.01); *H04N 1/6075* (2013.01)

(58) Field of Classification Search
CPC ............. H04N 1/00641; H04N 1/6075; H04N 1/00721
See application file for complete search history.

(56) References Cited

U.S. PATENT DOCUMENTS

| | | | | |
|---|---|---|---|---|
| 2005/0185222 | A1* | 8/2005 | Sammis | H04N 1/00477 358/2.1 |
| 2015/0193674 | A1* | 7/2015 | Ishiguro | G06F 3/1253 358/1.15 |
| 2015/0227825 | A1* | 8/2015 | Koriyama | H04N 1/603 358/1.9 |
| 2018/0321885 | A1* | 11/2018 | Isaak | G06F 3/1258 |
| 2019/0121588 | A1* | 4/2019 | Teruya | G06F 3/1263 |

FOREIGN PATENT DOCUMENTS

JP    2014021876    2/2014

* cited by examiner

*Primary Examiner* — Juan M Guillermety
(74) *Attorney, Agent, or Firm* — JCIPRNET (57) ABSTRACT

An image forming system includes a first image forming apparatus, a second image forming apparatus, a determining unit, and a display unit. The first image forming apparatus includes a first image forming unit that forms an image with a first developer of a process color. The second image forming apparatus includes a second image forming unit that includes a second developer and that forms an image with the second developer. The second developer has characteristics different from characteristics of the first developer on a medium. The determining unit determines, on the basis of image formation conditions designated by a user, a printing order in which an image formed with the first developer and an image formed with a second developer are printed on one medium, and determines a sequence in which the image forming apparatuses perform image formation on the basis of the determined printing order. The display unit displays the sequence determined by the determining unit.

18 Claims, 10 Drawing Sheets

| SHEET | GAZE DIRECTION | PURPOSE | SPOT-COLOR TONER | PRINT ORDER |
|---|---|---|---|---|
| TRANSPARENT SHEET | IMAGE SIDE (COLORED SHEET OR (ORDINARY SHEET)) | METALLIC COLOR | SILVER | 2 → 1 |
| | | IMPROVED COLOR REPRODUCTION | WHITE | 2 → 1 |
| | | GOLD/SILVER STAMP | GOLD OR SILVER | 1 → 2 |
| | | WHITE STAMP | WHITE | 1 → 2 |
| | | LUSTER | CLEAR | 1 → 2 |
| | NO IMAGE SIDE | METALLIC COLOR | SILVER | 1 → 2 |
| | | IMPROVED COLOR REPRODUCTION | WHITE | 1 → 2 |
| | | GOLD/SILVER STAMP | GOLD OR SILVER | 2 → 1 |
| | | WHITE STAMP | WHITE | 2 → 1 |
| | | LUSTER | CLEAR | 2 → 1 |

FIG. 10

IMAGE FORMING SYSTEM FOR REDUCING WRONG PRINTING ORDER

CROSS-REFERENCE TO RELATED APPLICATIONS

This application is based on and claims priority under 35 USC 119 from Japanese Patent Application No. 2018-053907 filed Mar. 22, 2018.

BACKGROUND

(i) Technical Field

The present disclosure relates to an image forming system.

(ii) Related Art

Japanese Unexamined Patent Application Publication No. 2014-021876 (paragraphs [0040] to [0050] and FIG. 5) discloses a technology related to forming of images multiple times on a single medium using multiple image forming apparatuses.

Japanese Unexamined Patent Application Publication No. 2014-021876 (paragraphs [0040] to [0050] and FIG. 5) discloses a printing system including a printing device including C, M, Y, and K toners and a printing device including a toner other than C, M, Y, and K toners. In Japanese Unexamined Patent Application Publication No. 2014-021876 (paragraphs [0040] to [0050] and FIG. 5), a first printing device that has received print data analyzes print data to determine whether the data requires print processing of a second printing device. In the case where the first printing device is to perform printing first, when transferring print data to the second printing device, the first printing device instructs the second printing device to keep from (stand by for) printing and performs printing first (first printing). Then, a medium that has undergone printing of the first printing device is placed in a tray of the second printing device, and, in response to an input of a print instruction, the second printing device performs printing (subsequent printing).

SUMMARY

Aspects of non-limiting embodiments of the present disclosure relate to reduction of image formation in a wrong order on a medium to form an image using multiple image forming apparatuses, compared to the case where the order in which the image forming apparatuses are used is not displayed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming system including a first image forming apparatus including a first image forming unit that forms an image with a first developer of a process color; a second image forming apparatus including a second image forming unit that includes a second developer and that forms an image with the second developer, the second developer having characteristics different from characteristics of the first developer on a medium; a determining unit that determines, on the basis of image formation conditions designated by a user, a printing order in which an image formed with the first developer and an image formed with a second developer are printed on one medium, and determines a sequence in which the image forming apparatuses perform image formation on the basis of the determined printing order; and a display unit that displays the sequence determined by the determining unit.

BRIEF DESCRIPTION OF THE DRAWINGS

An exemplary embodiment of the present disclosure will be described in detail based on the following figures, wherein:

FIGS. 5A, 5B, and 5C illustrate a display screen for a user to designate image formation conditions of the exemplary embodiment, where FIG. 5C illustrates a screen for a user to designate a hue;

FIGS. 6A and 6B illustrate an example of an image formed, where

FIGS. 7A and 7B illustrate an example of a display screen according to the exemplary embodiment, where

DETAILED DESCRIPTION

An exemplary embodiment is described with reference to the drawings as a specific example of an embodiment of the present disclosure. The present disclosure, however, is not limited to the following exemplary embodiment.

For ease of understanding the following description, throughout the drawings, the frontward and rearward directions are expressed as an X-axis direction, the leftward and rightward directions are expressed as a Y-axis direction, and the upward and downward directions are expressed as a Z-axis direction. Directions or sides denoted by arrows X, −X, Y, −Y, Z, and −Z respectively indicate the frontward, rearward, rightward, leftward, upward, and downward directions or the front side, the rear side, the right side, the left side, the upper side, and the lower side.

In each of the drawings, an encircled dot denotes an arrow directing from the far side to the near side of the drawing and an encircled cross denotes an arrow directing from the near side to the far side of the drawing.

In the following description using the drawings, components other than those necessary for the description are appropriately omitted for ease of understanding.

Exemplary Embodiment

Figure 1:
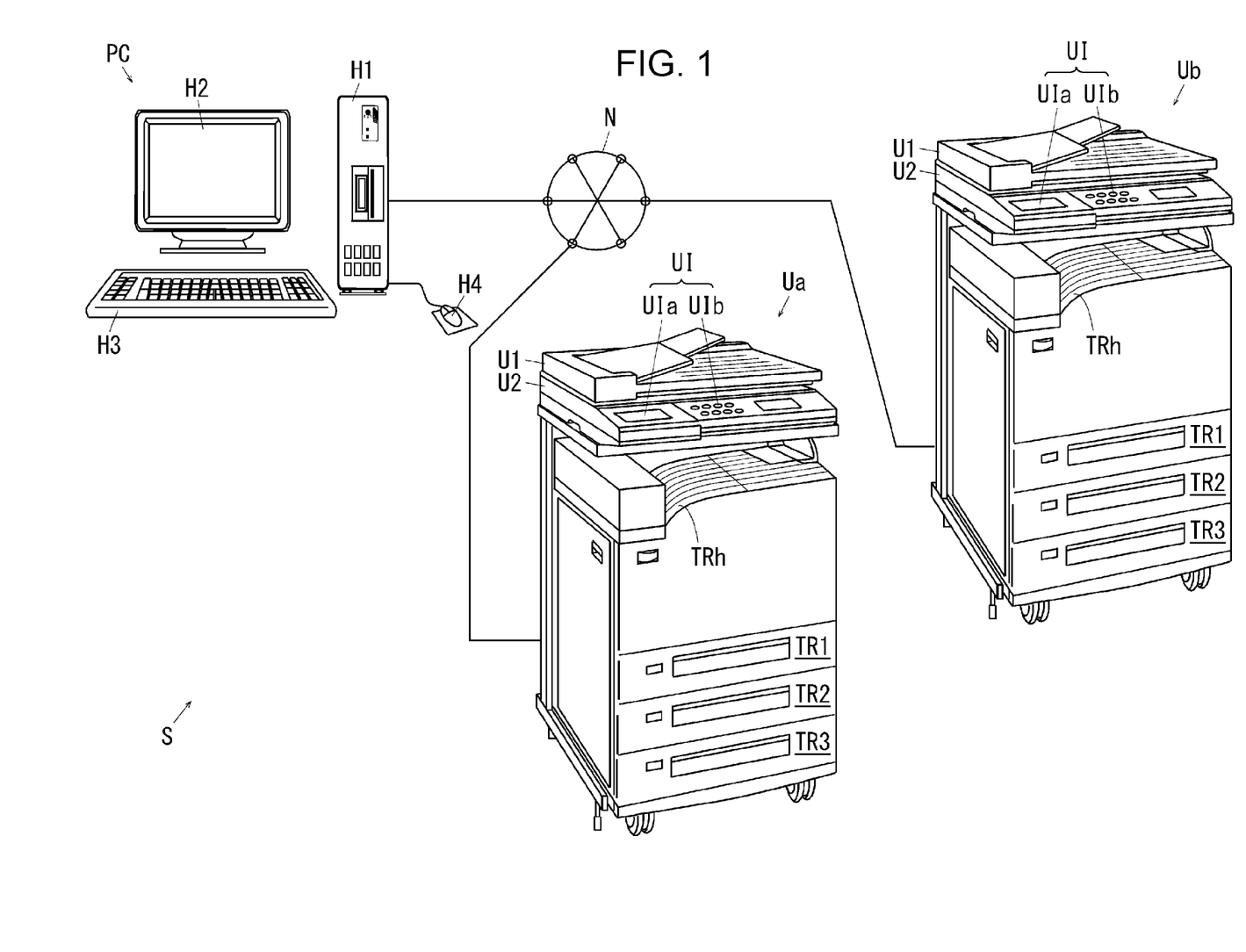
FIG. 1 illustrates the entirety of an image forming system according to an exemplary embodiment of the present disclosure.

FIG. 1 illustrates the entirety of an image forming system according to an exemplary embodiment of the present disclosure.

In FIG. 1, an image forming system S according to an exemplary embodiment includes a client personal computer PC, which is an example of an information processor. The client personal computer PC is connected to multifunctional devices U, which are examples of image forming apparatuses, with a network N, which is an example of a communication line. The multifunctional devices U according to the exemplary embodiment are image forming apparatuses publicly known and having functions of a copier, a printer, a FAX machine, and a scanner. In the exemplary embodiment, multiple multifunctional devices Ua and Ub are connected to the network N.

The network N according to the exemplary embodiment is constituted of so-called Internet. The client personal computer PC according to the exemplary embodiment is constituted of a computer device, which is an example of an electronic computer.

The client personal computer PC according to the exemplary embodiment includes a computer body H1, which is an example of an apparatus body. A display H2, which is an example of a display unit, is connected to the computer body H1. A keyboard H3 and a mouse H4, which are examples of input units, are connected to the computer body H1. The computer body H1 includes a hard disk drive (HD drive), which is an example of a storage, not illustrated, and a compact disk drive (CD drive), which is an example of a reader of a storage medium.

Figure 2:
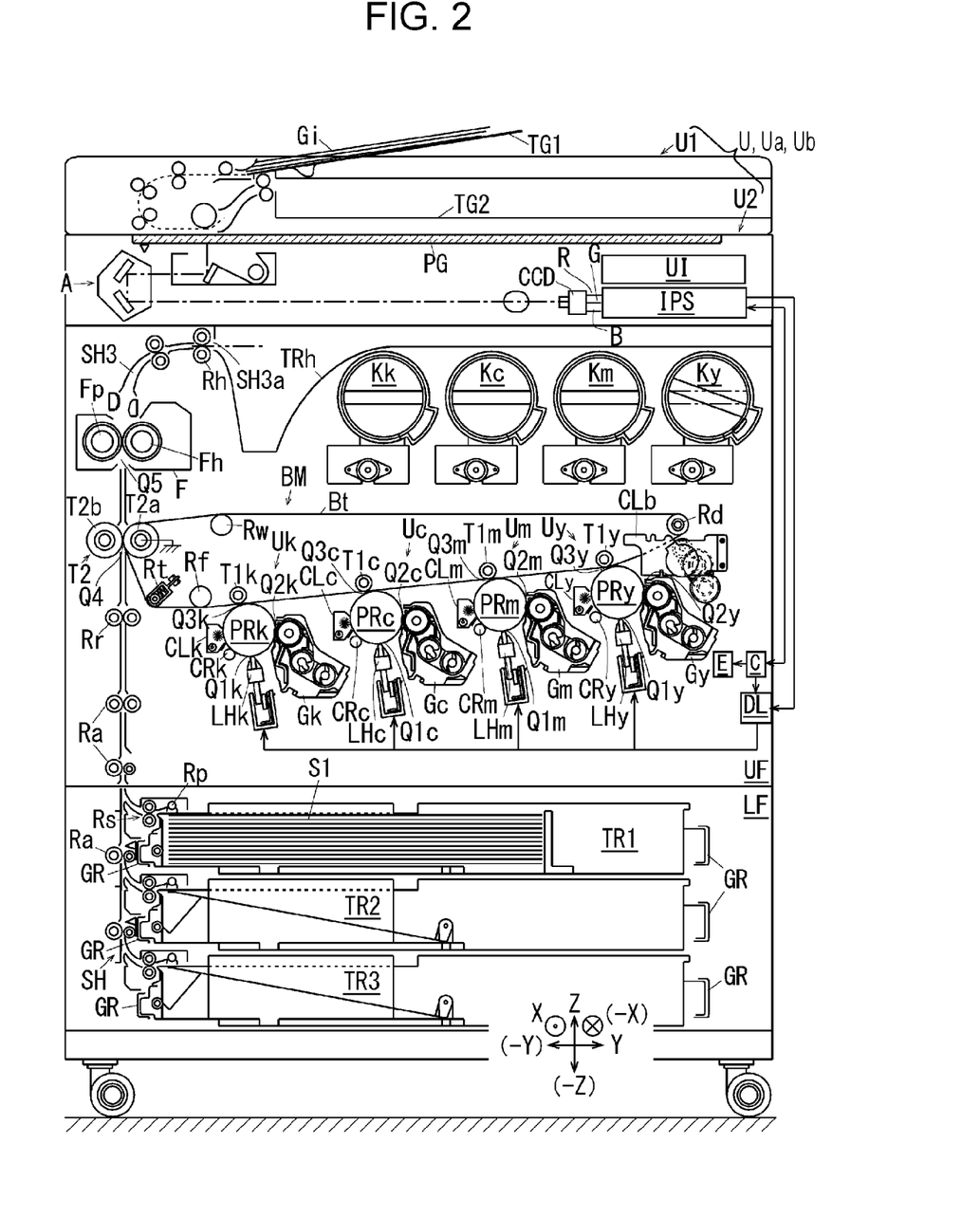
FIG. 2 illustrates the entirety of an image forming apparatus according to the exemplary embodiment of the present disclosure.

FIG. 2 illustrates the entirety of the image forming apparatus according to the exemplary embodiment of the present disclosure.

In FIG. 2, the multifunctional devices U (Ua and Ub), which are examples of image forming apparatuses, each include an original transporting device U1, on the upper side, and an apparatus body U2, on the lower side.

The original transporting device U1 includes an original feeder TG1. The original feeder TG1 receives a stack of multiple originals Gi that are to be copied. An original discharging unit TG2 is disposed under the original feeder TG1. The original discharging unit TG2 receives an original Gi that has been fed from the original feeder TG1 and that has passed an original read position on an original read surface PG.

The apparatus body U2 includes an operating unit UI, on which a user inputs an operation command signal such as an image formation start, and an exposure optical system A. The operating unit UI includes a display UIa, which is an example of a display unit, and an input button UIb, which is an example of an input unit. The display UIa according to the exemplary embodiment is a so-called touch screen, which allows a user to input a signal thereon with a touch of fingers. Specifically, the display UIa also has a function of an input unit.

Light reflected off a document transported over the original read surface PG by the original transporting device U1 or a document manually placed on the original read surface PG is converted into electric signals of red R, green G, and blue B by a solid-state image sensor CCD via the exposure optical system A.

In the first multifunctional device Ua, an information converting unit IPS converts the R, G, and B electric signals input from the solid-state image sensor CCD and print information transmitted from the client personal computer PC into image information for black K, yellow Y, magenta M, and cyan C, and temporarily stores the image information. The information converting unit IPS outputs the image information to a write circuit DL as image information for forming latent images at predetermined timing.

When the document image is a single-color image or a monochrome image, image information for only black K is input to the write circuit DL.

In the exemplary embodiment, the first multifunctional device Ua forms images with four-color developers for process colors of Y, M, C, and K, as examples of first developers. The second multifunctional device Ub forms images with four developers of a transparent developer, gold developer, a silver developer, and a white developer. The transparent developer is an example of a second developer through which the colors of the Y, M, C, and K developers are transmitted. The gold developer, the silver developer, and the white developer are examples of third developers that shield the colors of the Y, M, C, and K developers against light.

In the following description, the first multifunctional device Ua and the second multifunctional device Ub have the same structure except for using different developers. Thus, only the first multifunctional device Ua is described without describing the second multifunctional device Ub in detail.

The write circuit DL includes driving circuits for the colors Y, M, C, and K, not illustrated. The write circuit DL outputs signals corresponding to the input image information at predetermined timing to LED heads LHy, LHm, LHc, and LHk, which are examples of latent image forming devices for the respective colors. In the exemplary embodiment, the LED heads LHy to LHk each include a LED array in which LEDs are linearly arranged in the width direction of an image. The LEDs are examples of light-emitting devices. In the LED heads LHy to LHk, the LEDs emit light in accordance with the input signal. Thus, the LED heads LHy to LHk output write light corresponding to the input signals.

Figure 3:
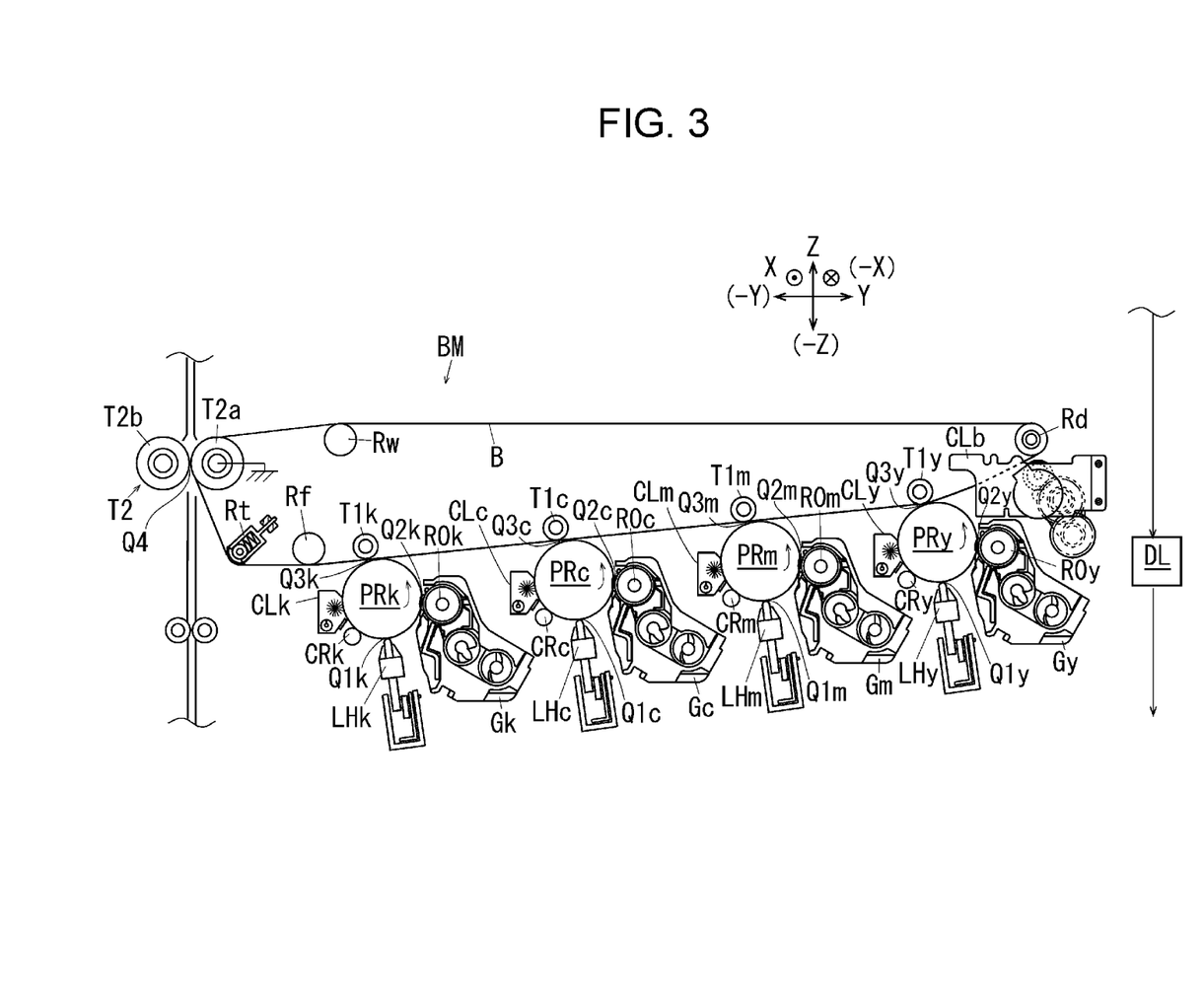
FIG. 3 is an enlarged view of a related portion of the image forming apparatus according to the exemplary embodiment.

FIG. 3 is an enlarged view of a related portion of the image forming apparatus according to the exemplary embodiment.

In FIGS. 2 and 3, photoconductors PRy, PRm, PRc, and PRk, which are examples of image carriers, are disposed above the LED heads LHy to LHk.

Charging rollers CRy, CRm, CRc, and CRk, which are examples of charging devices, are disposed upstream of the corresponding LED heads LHy to LHk in a direction in which the photoconductors PRy, PRm, PRc, and PRk rotate, while being in contact with the photoconductors PRy to PRk. Developing devices Gy, Gm, Gc, and Gk are disposed downstream of the corresponding LED heads LHy to LHk in the direction in which the photoconductors PRy to PRk rotate. First transfer rollers T1y, T1m, T1c, and T1k, which are examples of first transfer devices, are disposed downstream of the corresponding developing devices Gy to Gk in the direction in which the photoconductors PRy to PRk rotate. Photoconductor cleaners CLy, CLm, CLc, and CLk, which are examples of image carrier cleaners, are disposed downstream of the corresponding first transfer rollers T1y to T1k in the direction in which the photoconductors PRy to PRk rotate.

The Y-color photoconductor PRy, the charging roller CRy, the LED head LHy, the developing device Gy, the first transfer roller T1y, and the photoconductor cleaner CLy constitute a Y-color image forming unit (first image forming unit) Uy, which is an example of a Y-color visible image forming device according to the exemplary embodiment that forms a toner image, which is an example of a visible image. Similarly, each of the photoconductors PRm, PRc, and PRk, the corresponding one of the charging rollers CRm, CRc, and CRk, the corresponding one of the LED heads LHm, LHc, and LHk, the corresponding one of the developing devices Gm, Gc, and Gk, the corresponding one of the first transfer rollers T1m, T1c, and T1k, and the corresponding one of the photoconductor cleaners CLm, CLc, and CLk constitute a M-color, C-color, or K-color image forming unit (first image forming unit) Um, Uc, or Uk. The second multifunctional device Ub also includes image forming units (third image forming units) corresponding to gold, silver, and white and an image forming unit (second image forming unit) corresponding to a transparent developer.

A belt module BM, which is an example of an intermediate transfer device, is disposed above the photoconductors PRy to PRk. The belt module BM includes an endless intermediate transfer belt Bt, which is an example of an image carrier and an example of an intermediate transfer member. The intermediate transfer belt Bt is rotatably supported by a belt driving roller Rd, which is an example of a driving member, a tension roller Rt, which is an example of a tensioning member, a walking roller Rw, which is an example of a member that compensates for deviation, an idler roller Rf, which is an example of a driven member, a backup roller T2a, which is an example of an opposing member facing a second transfer area, and the first transfer rollers T1y, T1m, T1c, and T1k.

A second transfer roller T2b, which is an example of a second transfer member, is disposed at such a position as to face the backup roller T2a with the intermediate transfer belt Bt interposed therebetween. In the exemplary embodiment, the backup roller T2a is grounded, and the second transfer roller T2b receives a second transfer voltage, which has a polarity opposite to the polarity with which the toner is electrically charged from a power supply circuit E. The backup roller T2a and the second transfer roller T2b constitute a second transfer device T2 according to the exemplary embodiment. The area over which the second transfer roller T2b comes into contact with the intermediate transfer belt Bt constitutes a second transfer area Q4.

A belt cleaner CLb, which is an example of a cleaner that cleans the intermediate transfer body, is disposed downstream of the second transfer area Q4 in a direction in which the intermediate transfer belt Bt rotates.

Components including the first transfer rollers T1y to T1k, the intermediate transfer belt Bt, and the second transfer device T2 constitute a transfer device T1+T2+B according to the exemplary embodiment. The image forming units Uy to Uk and the transfer device T1+T2+B constitute an image recording unit Uy+Um+Uc+Uk+T1+T2+B according to the exemplary embodiment.

Toner cartridges Ky, Km, Kc, and Kk, which are examples of developer containers, are detachably attached at a portion above the belt module BM.

In FIG. 2, three pairs of right and left guide rails GR, which are examples of guide members, are disposed at three different levels below the image forming units Uy to Uk. Each pair of guide rails GR support one of paper feed trays TR1 to TR3, which are examples of sheet feeders, in such a manner as to allow the paper feed tray to be inserted and removed frontward and rearward. The paper feed trays TR1 to TR3 hold recording sheets S, which are examples of media.

A pickup roller Rp, which is an example of a pickup member, is disposed at the upper left of each of the paper feed trays TR1 to TR3. Separation rollers Rs, which are examples of separation members, are disposed downstream of the pickup rollers Rp in the direction in which a recording sheet S is transported. A paper feed path SH, which extends upward and which is an example of a medium transport path, is formed downstream of the separation rollers Rs in the direction in which a recording sheet S is transported. Multiple transport rollers Ra, which are examples of transport members, are disposed on the paper feed path SH.

Registration rollers Rr, which are examples of members that adjust timing of sheet transport, are disposed on the paper feed path SH at positions upstream of the second transfer area Q4.

A fixing device F is disposed downstream of the second transfer area Q4 in the direction in which a recording sheet S1 is transported. The fixing device F includes a heating roller Fh, which is an example of a member for fixing an image by heating, and a pressing roller Fp, which is an example of a member for fixing an image by pressing. The area over which the heating roller Fh and the pressing roller Fp come into contact with each other constitutes a fixing area Q5.

A paper ejection path SH3, which is an example of a transport path, is disposed above the fixing device F. A paper output tray TRh, which is an example of a medium output portion, is formed on the upper surface of the apparatus body U2. The paper ejection path SH3 extends toward the paper output tray TRh. Ejection rollers Rh, which are examples of medium transport members, are disposed at a downstream end discharge port SH3a of the paper ejection path SH3.

Description of Functions of Multifunctional Device

Each multifunctional device U according to the exemplary embodiment having the above structure converts image information read by the solid-state image sensor CCD and print information transmitted from the client personal computer PC into Y, M, C, and K image information. In accordance with the converted image information, the LED heads LHy to LHk are controlled to output write light.

When an image forming operation is started, the photoconductors PRy to PRk start rotating. The power circuit E applies charging voltages to the charging rollers CRy to CRk. Thus, the surfaces of the photoconductors PRy to PRk are electrically charged by the charging rollers CRy to CRk. In write areas Q1y, Q1m, Q1c, and Q1k, electrostatic latent images are formed with write light from the LED heads LHy to LHk on the surfaces of the electrically charged photoconductors PRy to PRk. In development areas Q2y, Q2m, Q2c, and Q2k, the electrostatic latent images on the photoconductors PRy to PRk are developed by developing rollers R0y, R0m, R0c, and R0k of the developing devices Gy, Gm, Gc, and Gk into toner images, which are examples of visible images. When each of the developing devices Gy to Gk has its developer consumed, the developing device is replenished with the developer according to the consumed amount from the corresponding one of the toner cartridges Ky to Kk.

The toner images obtained after the development are transported to first transfer areas Q3y, Q3m, Q3c, and Q3k in which the toner images touch the intermediate transfer belt Bt, which is an example of an intermediate transfer body. In the first transfer areas Q3y, Q3m, Q3c, and Q3k, the power circuit E controlled by the controller C applies first transfer voltages, having a polarity opposite to the polarity with which toner is electrically charged, at predetermined timing to the first transfer rollers T1y to T1k disposed on the rear surface of the intermediate transfer belt Bt. Thus, the toner images on the photoconductors PRy to PRk are transferred to the intermediate transfer belt Bt by the first transfer rollers T1y to T1k. In the case of forming a multi-color toner image, a toner image disposed downstream is transferred so as to be superposed on a toner image that has been transferred to the intermediate transfer belt Bt in an upstream first transfer area.

Remnants or adherents remaining on the photoconductors PRy to PRk after the first transfer are removed by the photoconductor cleaners CLy to CLk. The cleaned surfaces of the photoconductors PRy to PRk are recharged by the charging rollers CRy to CRk.

A single-color or multi-color toner image that has been transferred to the intermediate transfer belt Bt by the first transfer rollers T1y to T1k in the first transfer areas Q3y to Q3k is transported to the second transfer area Q4.

Recording sheets S1 on which images are to be recorded are picked up by the pickup roller Rp on a selected one of the paper feed trays TR1 to TR3. When multiple recording sheets S1 are collectively picked up by the pickup roller Rp, the recording sheets S1 are separated one from another by the separation rollers Rs. Each recording sheet S1 separated by the separation rollers Rs is transported along the paper feed path SH1 by the transport rollers Ra. The recording sheet S1 that has been transported along the paper feed path SH is fed to the registration rollers Rr.

The registration rollers Rr transport the recording sheet S1 to the second transfer area Q4 at the same time when the toner image formed on the intermediate transfer belt Bt is transported to the second transfer area Q4. The power circuit E applies a second transfer voltage, having a polarity opposite to the polarity with which toner is electrically charged, to the second transfer roller T2b. Thus, the toner image on the intermediate transfer belt Bt is transferred from the intermediate transfer belt Bt to the recording sheet S1.

The intermediate transfer belt Bt after the second transfer is cleaned by the belt cleaner CLb, which is an example of an intermediate transfer body cleaner.

When the recording sheet S1 to which the toner image has been second transferred passes through the fixing area Q5, the toner image is heated and fixed to the recording sheet S1.

The recording sheet S1 to which the image has been fixed is transported along the paper ejection path SH3. The recording sheet S1 that has been transported along the paper ejection path SH3 is ejected to the paper output tray TRh by the ejection rollers Rh.

Description of Controller of Exemplary Embodiment

Figure 4:
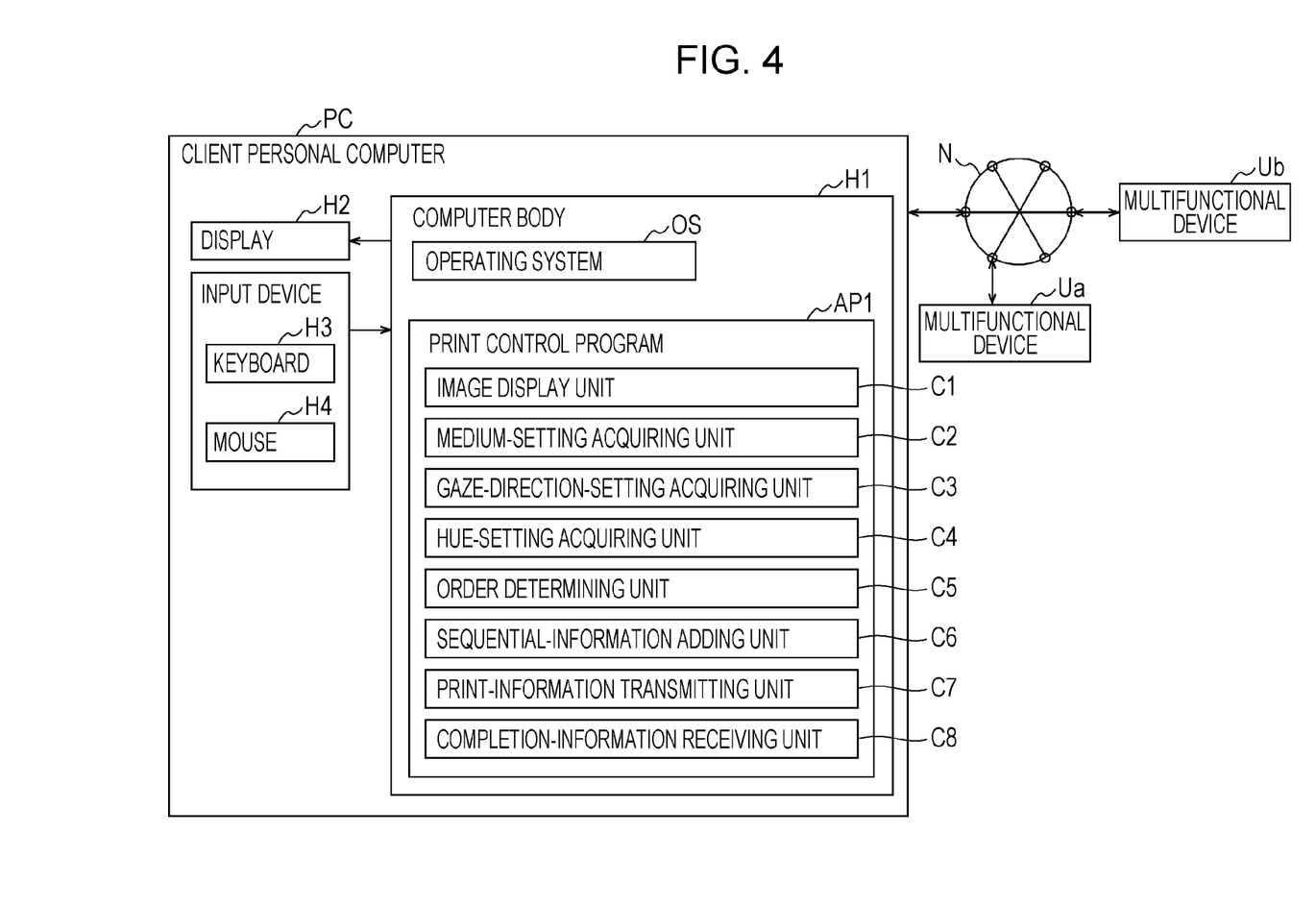
FIG. 4 is a functional block diagram of functions of a controller of a client personal computer according to the exemplary embodiment.

FIG. 4 is a functional block diagram of functions of a controller of a client personal computer according to the exemplary embodiment.

Description of Controller of Client Personal Computer PC

In FIG. 4, the computer body H1 of the client personal computer PC includes an input/output interface or an I/O. The input/output interface inputs or outputs a signal to or from an external device, and adjusts an input/output signal level. The computer body H1 includes a read only memory or a ROM. The read only memory stores, for example, programs or data used for performing necessary processing. The computer body H1 includes a random access memory or a RAM. The random access memory temporarily stores necessary data. The computer body H1 includes a central processing unit or a CPU. The central processing unit performs processing according to the program stored in, for example, a hard disk. The computer body H1 also includes a clock generator.

The client personal computer PC is capable of performing a variety of functions by executing programs stored in, for example, the hard disk or ROM.

The hard disk of the client personal computer PC stores an operating system OS, which is basic software. The operating system OS controls the basic operation of a computer device.

The hard disk of the client personal computer PC also stores a print control program AP1, which is an example of application software. In response to an input from a user, the print control program AP1 transmits print information or control signals to the multifunctional devices Ua and Ub in accordance with print settings to control printing.

The hard disk of the client personal computer PC stores, for example, word-processing software, which is an example of document preparation software not illustrated, or an application program for e-mail transmission/reception software.

Hereinbelow, the functions (control units) of the print control program AP1 are described, except for the operating system OS widely known thus far or application programs not illustrated.

Print Control Program AP1

The print control program AP1 has functions C1 to C8, below.

Figure 5A:
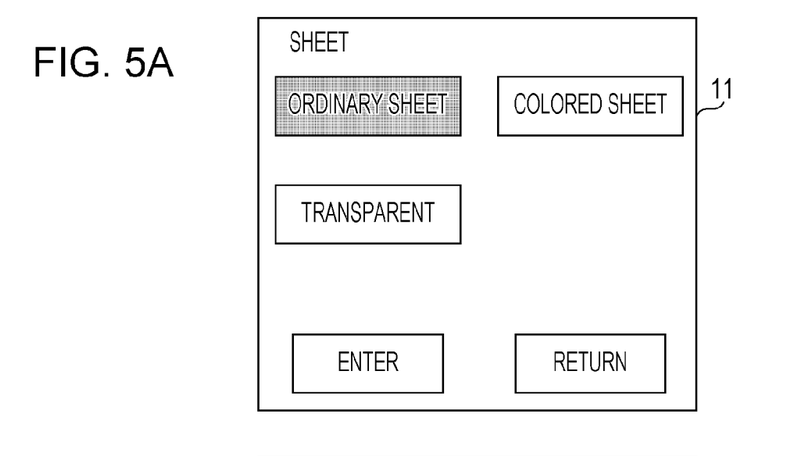
FIG. 5A illustrates a screen for a user to designate a medium to be used.
Figure 5B:
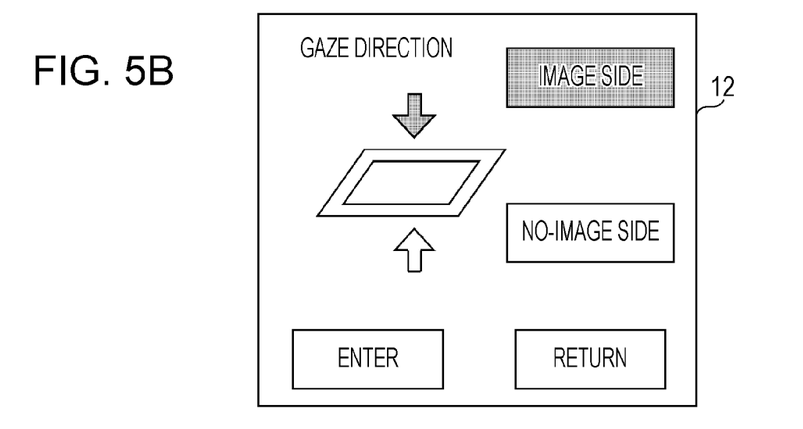
FIG. 5B illustrates a screen for a user to designate a gaze direction.
Figure 5C:
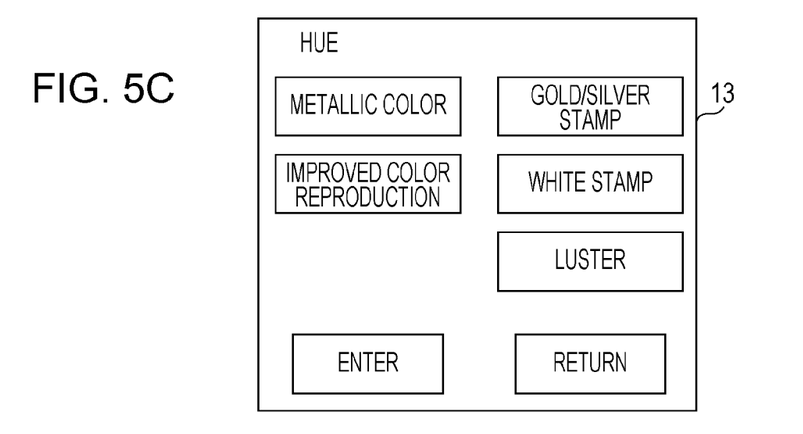

FIGS. 5A, 5B, and 5C illustrate a display screen for a user to designate image formation conditions of the exemplary embodiment, where FIG. 5A illustrates a screen for a user to designate a medium to be used, FIG. 5B illustrates a screen for a user to designate a gaze direction, and FIG. 5C illustrates a screen for a user to designate a hue.

The image display unit C1 causes the display H2 to display an image for a user to designate the image formation conditions on the client personal computer PC. As illustrated in FIG. 5A, the image display unit C1 according to the exemplary embodiment displays a medium-type designating image 11 for a user to designate the type of a recording sheet S1 to print a document or an image in response to an input for designating the image formation conditions (input of print settings). The medium-type designating image 11 enables a user to select and designate any one of an ordinary sheet, a colored sheet, and a transparent sheet.

When Enter is input into the medium-type designating image 11, the image display unit C1 displays a gaze-direction designation image 12 for a user to designate the gaze direction illustrated in FIG. 5B. The gaze-direction designation image 12 enables a user to designate the direction in which the printed recording sheet S1 is viewed. Specifically, for a transparent sheet, the gaze-direction designation image 12 enables a user to designate whether the sheet is viewed from a print side (image side or top surface of the sheet) or from a no-image side (back side of the sheet). For example, when a label of a PET bottle is to be printed, the label is wound around the PET bottle for the no-image surface to be located outside, so that the inner printed image is prevented from being damaged when the outer surface is scratched. For printing of such a purpose, the gaze direction is designated as the no-image side. In the exemplary embodiment, both the image side and no-image side are allowed to be designated as a gaze direction.

Figure 6A:
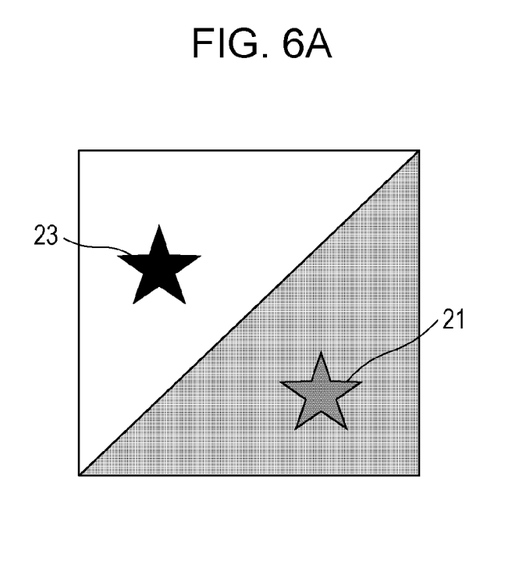
FIG. 6A illustrates the case where a metallic color and a gold/silver stamp are designated.
Figure 6B:
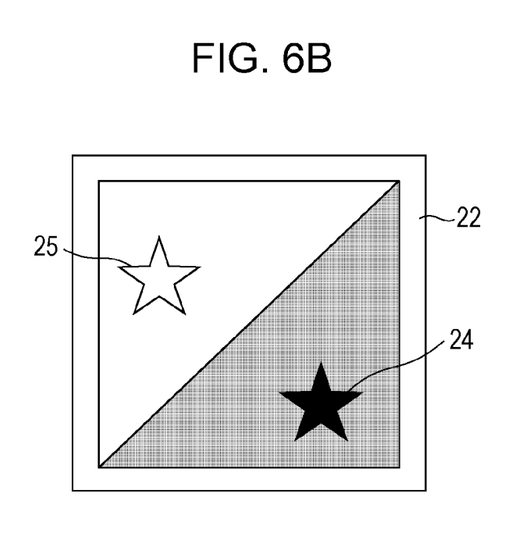
FIG. 6B illustrates the case where improved color reproduction, a white stamp, and a gold/silver stamp are designated.

FIGS. 6A and 6B illustrate examples of images formed, where FIG. 6A illustrates the case where a metallic color and a gold/silver stamp are designated, and FIG. 6B illustrates the case where improved color reproduction, a white stamp, and a gold/silver stamp are designated.

When Enter is input into the gaze-direction designation image 12, the image display unit C1 displays a hue designation image 13 for a user to designate the hue illustrated in FIG. 5C. In FIG. 5C, the hue designation image 13 according to the exemplary embodiment enables a user to designate the hue from among a metallic color, improved color reproduction, a gold/silver stamp, a white stamp, and a luster. The metallic color is designated to form an image having a metallic luster by superposing Y, M, C, and K images on the surface of a silver image. For example, in FIG. 6A, an image that seems like a yellow image 21 having a metallic luster is allowed to be formed by superposing a Y-color image on the surface of a silver image, serving as a base.

When improved color reproduction is designated, Y, M, C, and K images are printed in a manner superposed on the surface of a white image. Particularly, when Y, M, C, and K images are directly formed on a colored sheet or transparent recording sheet S1, the color of the colored sheet may be mixed with the images or the images may be viewed through the transparent sheet and may have its hue changed. To avoid this, as illustrated in FIG. 6B, a white image 22 is used as a base to improve color reproduction of the Y, M, C, and K images (so that the Y, M, C, and K images are clearly viewed) on a colored sheet or a transparent sheet.

When a gold/silver stamp or a white stamp is designated, an image including gold, silver, and white portions that look like being stamped with a gold 23, a silver 24, and a white 25, as illustrated in FIGS. 6A and 6B, is allowed to be formed by superposing light-shielding gold, silver, and white developers on the Y, M, C, and K images.

When a luster is designated, a luster is allowed to be provided to an image by superposing a transparent developer layer on the Y, M, C, and K images to coat the Y, M, C, and K images with a transparent film.

Figure 7A:
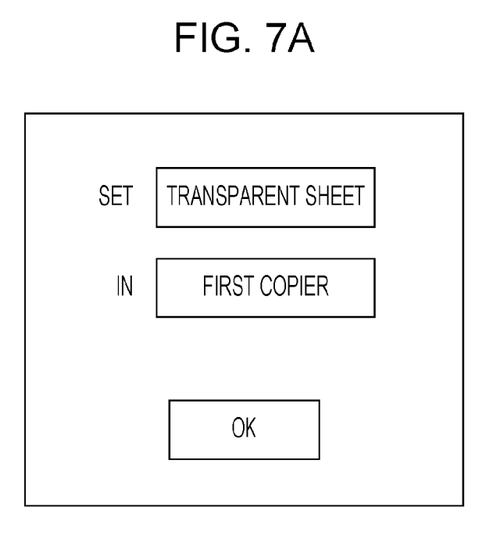
FIG. 7A illustrates an example of an image displayed before an image formation.
Figure 7B:
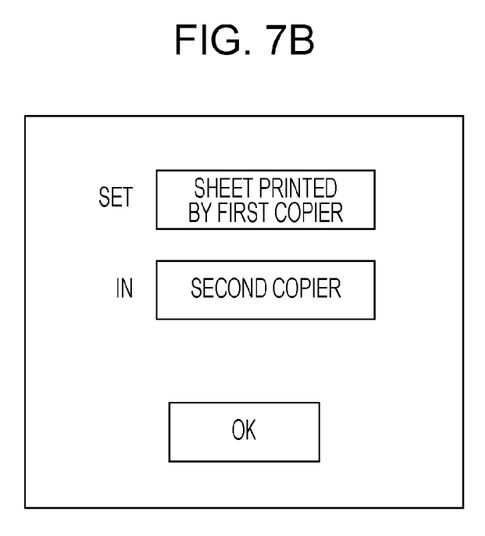
FIG. 7B illustrates an example of an image displayed after the image formation.

FIGS. 7A and 7B illustrate an example of a display screen according to the exemplary embodiment, where FIG. 7A illustrates an example of an image displayed before image formation, and FIG. 7B illustrates an example of an image displayed after image formation.

In response to an input of print start in the client personal computer PC, the image display unit C1 according to the exemplary embodiment displays, on the display H2, an image of a message prompting a user to set a recording sheet S1 into either one of the multifunctional devices Ua and Ub that performs printing subsequently, as illustrated in FIGS. 7A and 7B. Here, as illustrated in FIG. 7A, the multifunctional device that is to print first displays a message prompting a user to set the designated recording sheet S1 into the multifunctional device Ua that is to perform printing, and the other one of the multifunctional devices Ua and Ub that is to print second or after, as illustrated in FIG. 7B, displays a message prompting a user to set the recording sheet S1 that has undergone recording into the multifunctional device Ub that is to perform printing.

The medium-setting acquiring unit C2 acquires the type of the designated recording sheet S1, that is, medium setting information in accordance with an input of the medium-type designating image 11.

The gaze-direction-setting acquiring unit C3 acquires designated gaze-direction setting information in accordance with an input of the gaze-direction designation image 12.

The hue-setting acquiring unit C4 acquires designated hue setting information in accordance with an input of the hue designation image 13.

Figure 8:
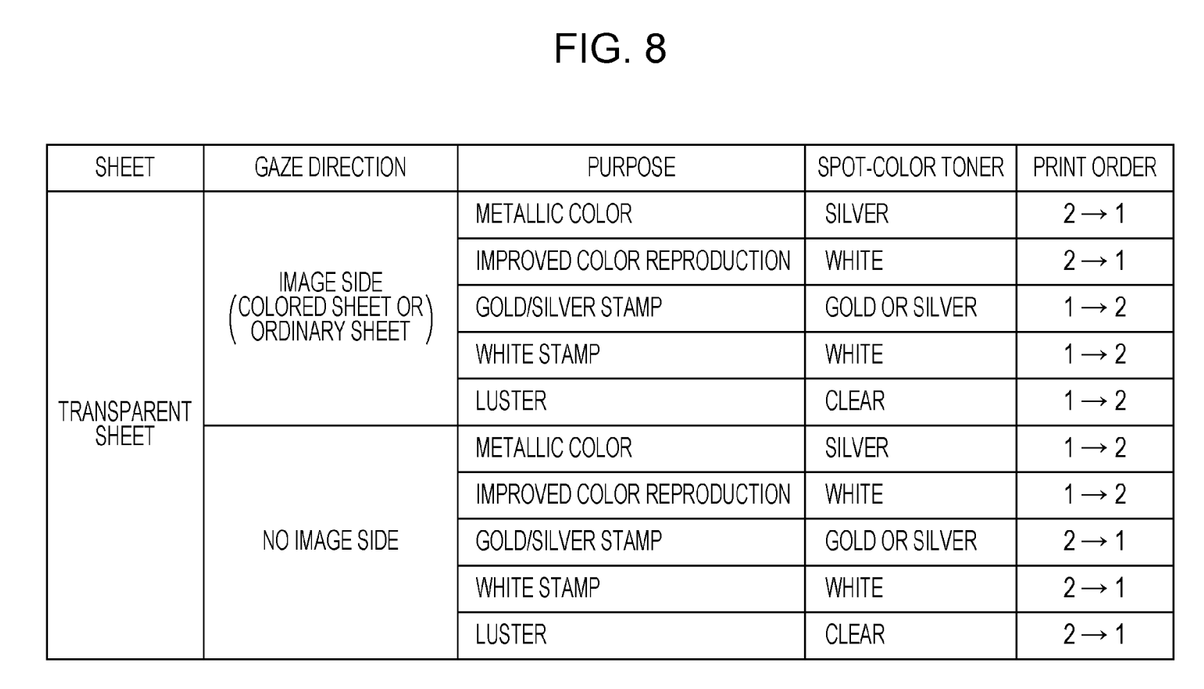
FIG. 8 is a table showing the image printing order corresponding to sets of the image formation conditions.

FIG. 8 is a table showing the image printing order corresponding to sets of the image formation conditions.

The order determining unit C5 determines, on the basis of the designated image formation conditions, the printing order in which an image formed with the Y, M, C, and K developers, an image formed with the transparent developer, and an image formed with any of gold, silver, and white developers are to be printed. Then, on the basis of the determined printing order, the sequence in which the multifunctional devices Ua and Ub are used for forming images is determined.

In FIG. 8, when the image formed by the second multifunctional device Ub is designated to be placed at the far side (to serve as a base) in the gaze direction, specifically, a metallic color or improved color reproduction is designated, the order determining unit C5 according to the exemplary embodiment determines that the second multifunctional device Ub and the first multifunctional device Ua are used in this sequence for printing.

When an image formed by the second multifunctional device Ub, such as a gold/silver stamp, a white stamp, or a luster is designated to be placed at the top surface, the order determining unit C5 determines that the first multifunctional device Ua and the second multifunctional device Ub are used in this sequence for printing.

When, as in the case where both improved color reproduction (and/or a metallic color) and a luster are designated, the images formed by the second multifunctional device Ub are designated to be placed for use as both the base and the top surface, the order determining unit C5 determines that the second multifunctional device Ub (white base and/or silver base), the first multifunctional device Ua (Y, M, C, and K images), and the second multifunctional device Ub (transparent) are used in this sequence for printing.

When improved color reproduction is designated on both sides in the gaze direction, the order determining unit C5 determines that the first multifunctional device Ua (Y, M, C, and K images on the back surface), the second multifunctional device Ub (white base), the first multifunctional device Ua (Y, M, C, and K images on the top surface) are used in this sequence for printing.

When improved color reproduction and a luster are designated on both sides in the gaze direction, the order determining unit C5 determines that the second multifunctional device Ub (transparent on the back surface), the first multifunctional device Ua (Y, M, C, and K images on the back surface), the second multifunctional device Ub (white base), the first multifunctional device Ua (Y, M, C, and K images on the top surface), and the second multifunctional device Ub (transparent on the top surface) are used in this sequence for printing.

The sequential-information adding unit C6 adds sequential information to the print information transmitted to the multifunctional devices Ua and Ub when printing involves the use of the multiple multifunctional devices Ua and Ub. For example, when the second multifunctional device Ub and the first multifunctional device Ua are used in this sequence, the sequential-information adding unit C6 adds sequential information indicating that "to be subsequently printed by the first multifunctional device Ua" to the print information transmitted to the second multifunctional device Ub, and adds sequential information indicating that "not to be subsequently printed by any other image forming apparatus" to the print information transmitted to the first multifunctional device Ua.

The print-information transmitting unit (information processing unit) C7 transmits print information to the multifunctional devices Ua and Ub. In the exemplary embodiment, when the multiple multifunctional devices Ua and Ub are used in sequence for printing, the print-information transmitting unit C7 transmits print information to the next-to-print one of the multifunctional devices Ua and Ub. Then, upon receipt of information on print completion from the one of the multifunctional devices Ua and Ub, the print-information transmitting unit C7 transmits print information to the subsequent one of the multifunctional devices Ua and Ub. Specifically, the print-information transmitting unit C7 does not transmit the print information to the multifunctional devices Ua and Ub whose turn has not come.

The completion-information receiving unit C8 receives print completion information transmitted from the multifunctional devices Ua and Ub.

Description of Controller of Image Forming Apparatus

Figure 9:
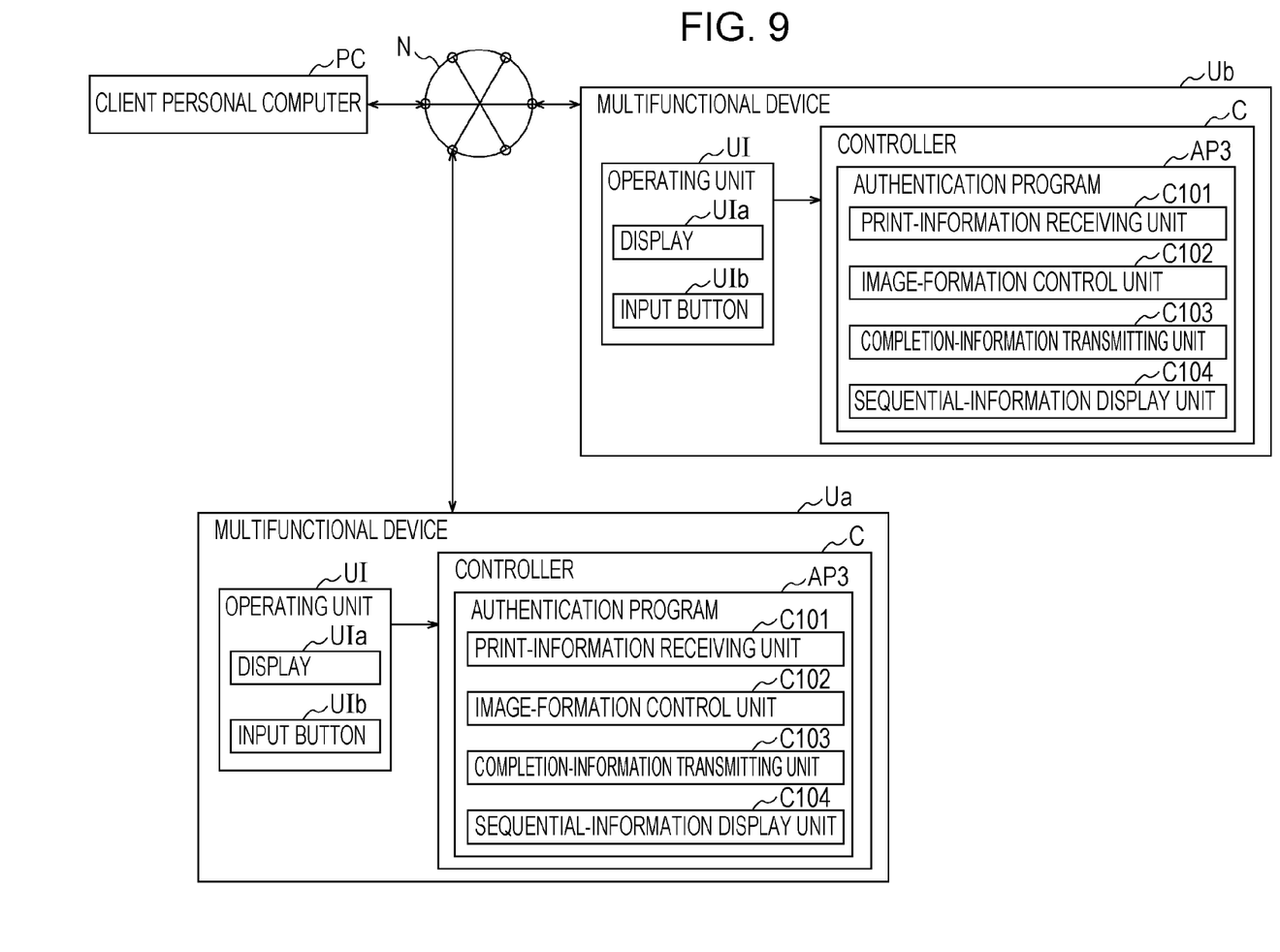
FIG. 9 is a functional block diagram of the functions of multifunctional devices according to the exemplary embodiment.

FIG. 9 is a functional block diagram of functions of the multifunctional devices according to the exemplary embodiment.

The controller C of the first multifunctional device Ua is described below, but the controller C of the second multifunctional device Ub is not, since the controllers C are similar to each other.

The controller C of the first multifunctional device Ua according to the exemplary embodiment includes an input/output interface or an I/O, which inputs or outputs signals to or from external devices. The controller C includes a read only memory or a ROM that stores programs and information for performing necessary processing. The controller C also includes a random access memory or a RAM that temporarily stores necessary data. The controller C also includes a central processing unit or a CPU that performs processing according to the program stored in, for example, a ROM. The controller C according to the exemplary embodiment is formed of a small information processor, that is, a microcomputer. The controller C is thus capable of performing a variety of functions by executing programs stored in, for example, a ROM.

Signal Output Elements Connected to Controller C

The controller C receives signals output from signal output elements such as the operating unit UI or various different sensors, not illustrated.

The operating unit UI includes a display UIa and an input button UIb. The input button UIb according to the exemplary embodiment includes a start key, for starting an image forming operation, numeric keys, and an arrow key.

Functions of Controller C

The controller C has a function of outputting control signals to the control elements by performing processing corresponding to the signals input from the signal output elements. Specifically, the controller C has functions C101 to C104, described as follows.

The print-information receiving unit C101 receives print information transmitted from the client personal computer PC.

The image-formation control unit C102 controls reading of the original transporting device U1, driving of components of the apparatus body U2, and the timing at which voltages are applied, to perform a job, which is an image forming operation.

The completion-information transmitting unit C103 transmits print completion information for noticing completion of printing to the client personal computer PC in response to the completion of printing of print information transmitted from the client personal computer PC.

The sequential-information display unit C104 displays a message on the display UIa on the basis of sequential information added to the print information transmitted from the client personal computer PC. Upon receipt of the print information to which the sequential information is added from the client personal computer PC, the sequential-information display unit C104 displays, on the display UIa, an image prompting a user to check a medium similar to that illustrated in FIG. 6A. In the exemplary embodiment, upon receipt of print information to which the sequential information is added, and after a user checks the display UIa and inputs a start key, the controller C starts a job. When the first multifunctional device Ua finishes printing and the second multifunctional device Ub is to perform printing next, the sequential-information display unit C104 displays an image to prompt a user to set a medium printed by the first multifunctional device Ua into the second multifunctional device Ub, as in the case of FIG. 6B.

Description of Flowchart of Printing Control According to Exemplary Embodiment

Figure 10:
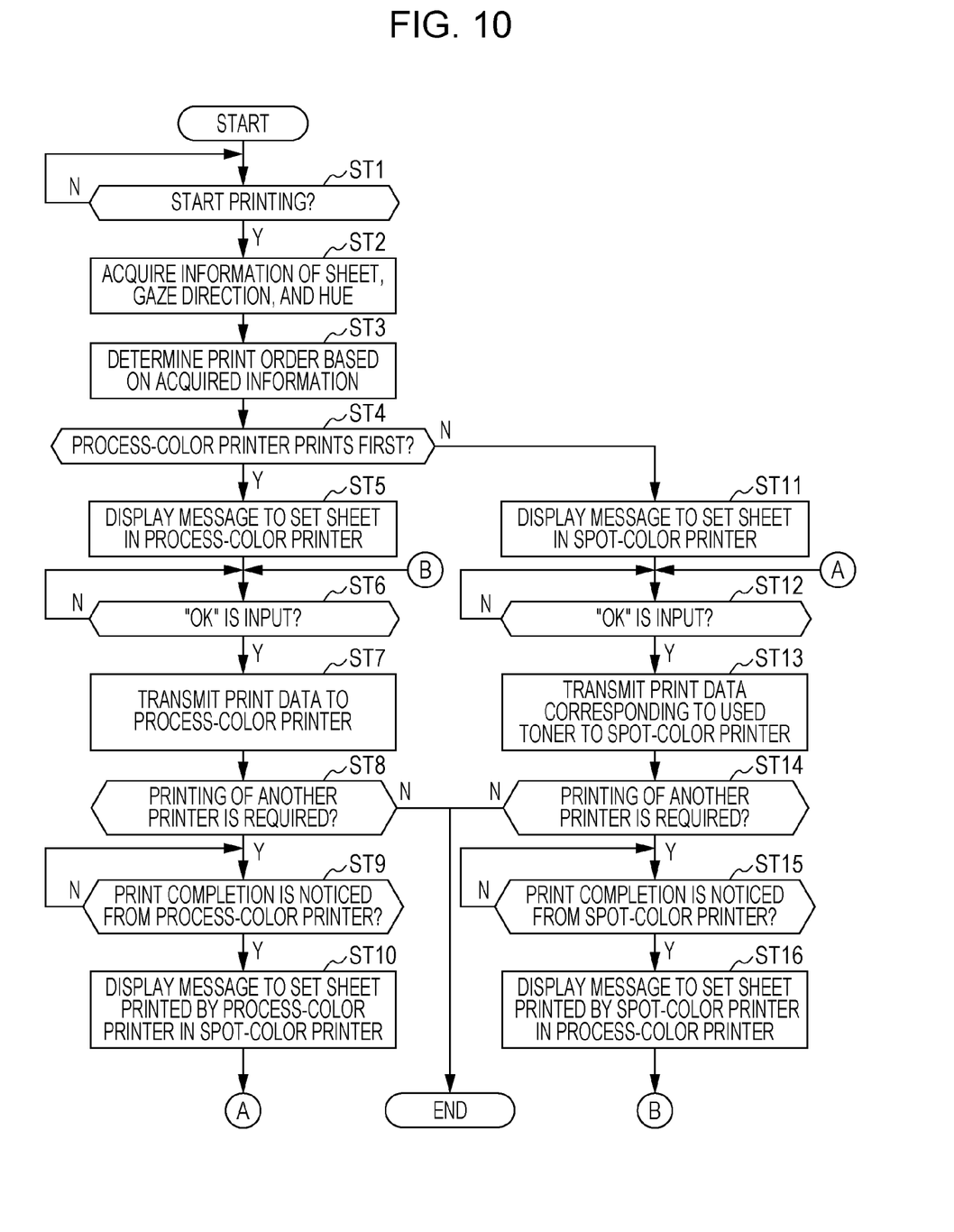
FIG. 10 is a flowchart of printing control processing according to the exemplary embodiment of the present disclosure.

FIG. 10 is a flowchart of printing control processing according to the exemplary embodiment of the present disclosure.

Processing in steps ST in the flowchart in FIG. 10 is performed in accordance with the print control program of the client personal computer PC. This processing is performed in a multitasking manner in parallel with other processing of the controller.

Processing of displaying an image prompting a user to designate the image formation conditions or processing of displaying an image on the displays UIa of the multifunctional devices Ua and Ub are neither illustrated nor described in detail.

The flowchart illustrated in FIG. 10 is started when the print control program AP1 is activated.

In ST1 of FIG. 10, whether print start is input is determined. If Yes (Y), the processing proceeds to ST2. If No (N), the processing repeats ST1.

In ST2, information on designated image formation conditions (sheet, gaze direction, and hue) is acquired. The processing then proceeds to ST3.

In ST3, a printing sequence is determined on the basis of acquired information of the image formation conditions. The processing then proceeds to ST4.

In ST4, whether a process-color printer (first multifunctional device Ua) is to perform printing first is determined. If Yes (Y), the processing proceeds to ST5. If No (N), the processing proceeds to ST11.

In ST5, a message prompting a user to set a recording sheet S1 of the designated type into the first multifunctional device Ua is displayed (refer to FIG. 6A). The processing then proceeds to ST6.

In ST6, whether "OK" is input through the displayed image is determined. If Yes (Y), the processing proceeds to ST7. If No (N), the processing repeats ST6.

In ST7, print data is transmitted to the first multifunctional device Ua. The processing then proceeds to ST8.

In ST8, whether printing is yet to be performed by another device (second multifunctional device Ub) is determined. If Yes (Y), the processing proceeds to ST9. If No (N), printing control processing is finished.

In ST9, whether a printing completion is noticed from the first multifunctional device Ua is determined. If Yes (Y), the processing proceeds to ST10. If No (N), the processing repeats ST9.

In ST10, a message prompting a user to set the sheet printed by the first multifunctional device Ua into the second multifunctional device Ub (spot-color printer) is displayed (refer to FIG. 6B). The processing then proceeds to ST12.

In ST11, a message prompting a user to set the recording sheet S1 of the designated type into the second multifunctional device Ub (refer to FIG. 6A) is displayed. The processing then proceeds to ST12.

In ST12, whether "OK" is input through the display image is determined. If Yes (Y), the processing proceeds to ST13. If No (N), the processing repeats ST12.

In ST13, print data is transmitted to the second multifunctional device Ub. The processing then proceeds to ST14.

In ST14, whether printing is yet to be performed by another device (first multifunctional device Ua) is determined. If Yes (Y), the processing proceeds to ST15. If No (N), the printing control processing is finished.

In ST15, whether the printing completion is noticed from the second multifunctional device Ub is determined. If Yes (Y), the processing proceeds to ST16. If No (N), the processing repeats ST15.

In ST16, a message prompting a user to set the sheet printed by the second multifunctional device Ub into the first multifunctional device Ua (spot-color printer) is displayed (refer to FIG. 6B). The processing then proceeds to ST6.

Operations of Exemplary Embodiment

In the image forming system S according to the exemplary embodiment having the above structure, a user is allowed to set the type of the recording sheet S1, the gaze direction, or the hue as image formation conditions. In accordance with the gaze direction or the hue, the sequence in which the first multifunctional device Ua and the second multifunctional device Ub perform printing is automatically determined. In accordance with the determined printing sequence, a message is displayed on the displays H2 and UIa. Thus, a user is capable of setting the recording sheet S1 into the next-to-print one of the multifunctional devices Ua and Ub with reference to the display, or setting the printed recording sheet S1 into the next-to-print one of the multifunctional devices Ua and Ub. Thus, in the case where the multiple multifunctional devices Ua and Ub form an image, the image is less likely to be formed in a wrong order on the recording sheet S1 than in the case where the sequence in which the multifunctional devices Ua and Ub are used is not displayed.

Particularly, when a single image forming apparatus is to form an image of various different hues using gold, silver, white, and transparent developers besides the Y, M, C, and K developers, the image forming apparatus needs to include photoconductors and developing devices for eight colors, and thus has a large size. The image forming apparatus is thus priced high or costs high. In contrast, in the exemplary embodiment, two widespread four-color image forming apparatuses are used to form images of various different hues. Compared to an uncommon eight-color image forming apparatus, the exemplary embodiment including two widespread four-color image forming apparatuses is priced lower or costs lower. Thus, the image forming system S according to the exemplary embodiment is capable of forming images under various image formation conditions while avoiding cost increase.

In the exemplary embodiment, on the basis of the determined printing order, print information is transmitted to the next-to-print one of the multifunctional devices Ua and Ub, and not transmitted to the other one of the multifunctional devices Ua and Ub that does not perform printing next. This structure prevents any of the multifunctional devices Ua and Ub that does not perform printing next from erroneously performing printing. This structure thus prevents an image from being formed in a wrong order on the recording sheet S1.

In the exemplary embodiment, in response to a user inputting a start key (input unit) on the next-to-print one of the multifunctional devices Ua and Ub, the multifunctional device forms an image. Thus, a user is allowed to start image formation while performing checking. Compared to the case where image formation is performed without being checked, mistakes such as a failure to set a recording sheet S1 or placing of the recording sheet S1 with its wrong side facing down or in a wrong orientation are reduced, so that mistakes of the sequence of image formation are reduced.

In the image forming system S according to the exemplary embodiment, when gold, silver, or white (spot color) developer underlies or overlies the Y, M, C, and K (process color) developers, or a transparent developer is used, the printing order is automatically determined in accordance with the designation. In addition, printing order is automatically determined in accordance with the gaze direction. When multiple image forming apparatuses are used, a user may perform printing in a wrong printing order if the user arbitrarily determines the printing order and transmits data to the multifunctional devices Ua and Ub. In contrast, in the exemplary embodiment, the printing order is automatically determined and data is transmitted to the multifunctional devices Ua and Ub. Thus, printing is less likely to be performed in a wrong order for a variety of sets of image formation conditions.

Modified Example

Thus far, an exemplary embodiment of the present disclosure has been described in detail. However, the present disclosure is not limited to the above-described exemplary embodiment and may be modified in various manners within the gist of the present disclosure described in the scope of claims. The following exemplarily describes modification examples (H01) to (H08) of the exemplary embodiment of the present disclosure.

H01

In the above-described exemplary embodiment, the images are not limited to the ones described exemplarily, and may be appropriately changed in accordance with the design or specifications.

H02

In the above-described exemplary embodiment, multifunctional devices having multiple functions are exemplarily described as examples of the image forming apparatuses, but they are not the only example. For example, a copier, printer, or a FAX machine may be usable as the image forming apparatus.

H03

In the above-described exemplary embodiment, the type of sheets, the gaze direction, and the hue are exemplarily used as examples of the image formation conditions, but they are not the only examples. Any one or two of these may be used as the image formation conditions, or other factors may be added to the image formation conditions. Gold, silver, white, and transparent developers are exemplarily illustrated as used developers, but they are not the only examples. For example, other process color developers (first developers) such as orange, green, and violet may be used. Alternatively, a developer (developer of a process color or a light-shielding developer) of a color determined for a corporation as its image color (so-called corporate color), or a counterfeit-proof developer that absorbs infrared rays (visible-light transmissive developer) may be used. Thus, the image formation conditions may be added or changed in accordance with the used developers. In addition, a transparent toner may be effectively used as a base to surround the image like a frame, which has not been exemplarily described in the embodiment.

H04

In the above-described exemplary embodiment, the structure of displaying the images illustrated in FIG. 5A to FIG. 5C is exemplarily described, but this is not the only example. For example, in FIG. 5A, when a transparent sheet is not selected, the hue designation image 13 of FIG. 5C may be displayed without displaying the gaze-direction designation image 12 of FIG. 5B, since the selectable gaze direction is limited to the image side. Besides, only the selectable purposes may be displayed, for example, the hue designation image 13 may omit the display of a metallic color when no metallic color is contained in the original image that is to undergo printing. In addition, the metallic color and the gold/silver stamp may be displayed as being unselectable when the second multifunctional device Ub includes no gold/silver developer.

H05

In the above-described exemplary embodiment, the structure in which print information is transmitted to only the next-to-print multifunctional device of multiple multifunctional devices Ua and Ub is exemplarily illustrated, but this is not the only example. For example, print information may be simultaneously transmitted to all the multifunctional devices, a print-ban control signal may be transmitted to the multifunctional device whose turn has not come, and a print-release control signal may be transmitted to the multifunctional device whose turn has come. Besides, a client personal computer PC may transmit all pieces of print information to a multifunctional device that is to perform printing first, and the multifunctional device that has finished printing may transmit print information to the next multifunctional device. Specifically, print information may be relayed one from another among the multifunctional devices that perform printing without having its transmission or reception being managed by the client personal computer PC.

H06

In the above-described exemplary embodiment, the structure in which a user manually moves the recording sheet S1 between the multiple multifunctional devices Ua and Ub is exemplarily described, but this is not the only example. Instead, the multifunctional devices Ua and Ub may be connected to each other with a sheet transport device, and the sheet printed by one of the multifunctional devices may be transported to the other multifunctional device.

H07

In the above-described exemplary embodiment, the structure in which a user inputs a start key to start printing with the multifunctional devices Ua and Ub is exemplarily described, but this is not the only example. Instead, a structure may automatically start forming images in response to a detection of a sheet set into a predetermined specific sheet tray or manual tray.

H08

In the above-described exemplary embodiment, the structure including two multifunctional devices Ua and Ub is exemplarily described, but this is not the only example. Three or more multifunctional devices may be included. Although a structure in which the client personal computer PC controls the image forming system S is exemplarily illustrated, this is not the only example. For example, a print server may be installed between the client personal computer PC and the multifunctional devices Ua and Ub to control transmission or reception of printing order or print information of the multifunctional devices Ua and Ub. Alternatively, instead of designating the image formation conditions with the client personal computer PC, the image formation conditions may be input with the operating unit UI (input unit) of either one of the multifunctional devices Ua and Ub.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming system, comprising:
   a first image forming apparatus including a first image forming unit the forms an image with a first developer of a process color;
   a second image forming apparatus including a second image forming unit that includes a second developer and that forms an image with the second developer, the second developer having characteristics different from characteristics of the first developer on a medium; and
   a processor controlling the first image forming apparatus and the second image forming apparatus, wherein the processor configured to:
   determine, on a basis of image formation conditions designated by a user, a printing order in which an image formed with the first developer and an image formed with a second developer are printed on one medium, and determine a sequence in which the image forming apparatuses perform image formation on a basis of the determined printing order;
   execute processing based on a gaze direction in which images on the medium are viewed or a hue expressed by superposing a plurality of images formed with the developers one on another as the designated image formation conditions; and
   display the determined sequence.

2. The image forming system according to claim 1, wherein the processor further configured to:
   execute processing based on an order in which the developers are superposed one on another designated by the user.

3. The image forming system according to claim 2, wherein the processor further configured to determine the printing order so that the second image forming apparatus performs image formation first to place the image formed with the second developer further than the first developer in the gaze direction.

4. The image forming system according to claim 3, wherein the processor further configured to determine the printing order so that the second image forming apparatus, the first image forming apparatus, and the second image forming apparatus perform image formation in this order to place the image formed with the second developer nearer than the first developer in the gaze direction.

5. The image forming system according to claim 4, wherein print image information is transmitted to the image forming units to place, when both sides of a medium are designated as the gaze direction, the image formed with the first developer, the image formed with the second developer, and the image formed with the first developer in this order in a superposing manner from the medium.

6. The image forming system according to claim 2, wherein print image information is transmitted to the image forming units to place, when both sides of a medium are designated as the gaze direction, the image formed with the first developer, the image formed with the second developer, and the image formed with the first developer in this order in a superposing manner from the medium.

7. The image forming system according to claim 3, wherein print image information is transmitted to the image forming units to place, when both sides of a medium are designated as the gaze direction, the image formed with the first developer, the image formed with the second developer, and the image formed with the first developer in this order in a superposing manner from the medium.

8. The image forming system according to claim 1, wherein the processor further configured to determine the printing order so that the second image forming apparatus performs image formation first to place the image formed with the second developer further than the first developer in the gaze direction.

9. The image forming system according to claim 8, wherein the processor further configured to determine the printing order so that the second image forming apparatus, the first image forming apparatus, and the second image forming apparatus perform image formation in this order to place the image formed with the second developer nearer than the first developer in the gaze direction.

10. The image forming system according to claim 9, wherein print image information is transmitted to the image forming units to place, when both sides of a medium are designated as the gaze direction, the image formed with the first developer, the image formed with the second developer, and the image formed with the first developer in this order in a superposing manner from the medium.

11. The image forming system according to claim 8, wherein print image information is transmitted to the image forming units to place, when both sides of a medium are designated as the gaze direction, the image formed with the first developer, the image formed with the second developer, and the image formed with the first developer in this order in a superposing manner from the medium.

12. The image forming system according to claim 1, wherein print image information is transmitted to the image forming units to place, when both sides of a medium are designated as the gaze direction, the image formed with the first developer, the image formed with the second developer, and the image formed with the first developer in this order in a superposing manner from the medium.

13. The image forming system according to claim 1, wherein a medium on which an image is formed by one of the first and second image forming apparatuses is manually transportable to a sheet feeder of the other image forming apparatus.

14. The image forming system according to claim 1, wherein, on a basis of the sequence, print image information is transmitted to a preceding one of the first and second image forming apparatuses that performs printing, and not transmitted to the other image forming apparatus, and print information is transmitted to the other image forming apparatus in response to a completion of image formation of the preceding image forming apparatus.

15. The image forming system according to claim 14, wherein the processor further configured to:
start image formation of the other image forming apparatus.

16. The image forming system according to claim 1, wherein information is transmitted on a basis of the sequence, the information allowing printing of a preceding one of the first and second image forming apparatuses that performs printing first and banning printing of the other image forming apparatus that performs printing subsequently, and the other image forming apparatus is allowed to perform printing in response to a completion of image formation of the preceding image forming apparatus.

17. The image forming system according to claim 16, wherein the processor further configured to:
start image formation of the other image forming apparatus.

18. An image forming system, comprising:
a first image forming apparatus including first image forming means for forming an image with a first developer of a process color;
a second image forming apparatus including second image forming means including a second developer for forming an image with the second developer, the second developer having characteristics different from characteristics of the first developer on a medium; and
a processor controlling the first image forming apparatus and the second image forming apparatus, wherein the processor configured to:
determine, on a basis of image formation conditions designated by a user, a printing order in which an image formed with the first developer and an image formed with a second developer are printed on one medium, and determine a sequence in which the image forming apparatuses perform image formation on a basis of the determined printing order;
execute processing based on a gaze direction in which images on the medium are viewed or a hue expressed by superposing a plurality of images formed with the developers one on another as the designated image formation conditions; and
display the determined sequence.

* * * * *